United States Patent
Hiraike

(10) Patent No.: US 9,813,586 B2
(45) Date of Patent: Nov. 7, 2017

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventor: Kou Hiraike, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/277,296

(22) Filed: Sep. 27, 2016

(65) Prior Publication Data

US 2017/0094110 A1    Mar. 30, 2017

(30) Foreign Application Priority Data

Sep. 29, 2015 (JP) .................. 2015-192210

(51) Int. Cl.

| | | |
|---|---|---|
| G06F 15/00 | (2006.01) | |
| G06F 3/12 | (2006.01) | |
| G06K 1/00 | (2006.01) | |
| G06K 15/00 | (2006.01) | |
| H04N 1/387 | (2006.01) | |
| H04N 1/00 | (2006.01) | |
| H04N 1/23 | (2006.01) | |
| B41J 3/46 | (2006.01) | |
| B41J 11/00 | (2006.01) | |
| B41J 13/00 | (2006.01) | |
| B41J 13/10 | (2006.01) | |

(52) U.S. Cl.
CPC ............. *H04N 1/3877* (2013.01); *B41J 3/46* (2013.01); *B41J 11/0025* (2013.01); *B41J 13/0054* (2013.01); *B41J 13/103* (2013.01); *H04N 1/00015* (2013.01); *H04N 1/00708* (2013.01); *H04N 1/00721* (2013.01); *H04N 1/00779* (2013.01); *H04N 1/2353* (2013.01)

(58) Field of Classification Search
CPC ............. H04N 1/3877; H04N 1/00015; H04N 1/00708; H04N 1/00721; H04N 1/00779; H04N 1/2353; B41J 3/46; B41J 11/0025; B41J 13/0054; B41J 13/103
USPC ....................... 358/1.14, 1.1, 1.13
See application file for complete search history.

(56) References Cited

U.S. PATENT DOCUMENTS

| | | | | |
|---|---|---|---|---|
| 2004/0174552 A1* | 9/2004 | Miyake | ...................... | B41J 3/46 358/1.12 |
| 2005/0073696 A1* | 4/2005 | Mackenzie | ........ | H04N 1/00408 358/1.6 |
| 2005/0225020 A1* | 10/2005 | Fukatsu | ............... | B65H 39/042 270/18 |

FOREIGN PATENT DOCUMENTS

| | | |
|---|---|---|
| JP | 07-108718 A | 4/1995 |
| JP | 2014-146057 A | 8/2014 |

* cited by examiner

*Primary Examiner* — Douglas Tran
(74) *Attorney, Agent, or Firm* — Canon U.S.A., Inc. IP Division

(57) ABSTRACT

A printing apparatus includes a storage unit for storing information indicating an orientation of a sheet stacked in a sheet stacking unit, a determination unit that determines whether to print an image in a first orientation corresponding to a case where the sheet is conveyed with a short side thereof as a leading edge from the sheet stacking unit, or to print the image in a second orientation corresponding to a case where the sheet is conveyed with a long side thereof as the leading edge from the sheet stacking unit, according to a setting value based on an operation of a user in a case (Continued)

where the information indicating the orientation of the sheet stacked in the sheet stacking unit is not stored in the storage unit.

9 Claims, 9 Drawing Sheets

FIG.3

| MANUAL FEEDING TRAY SETTING |
|---|
| B5 |
| A5 PORTRAIT |
| A5 LANDSCAPE |
| FREE SIZE |

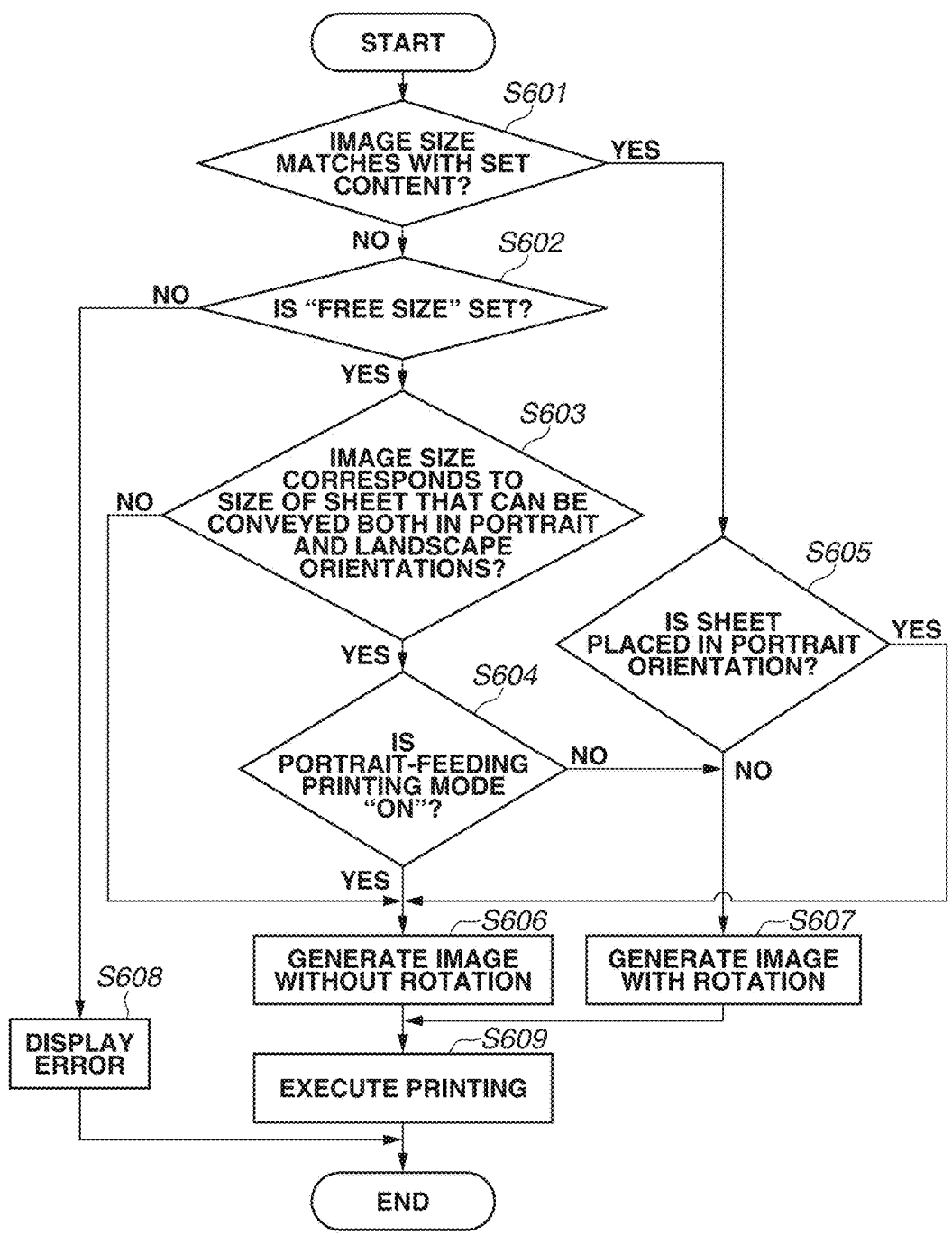

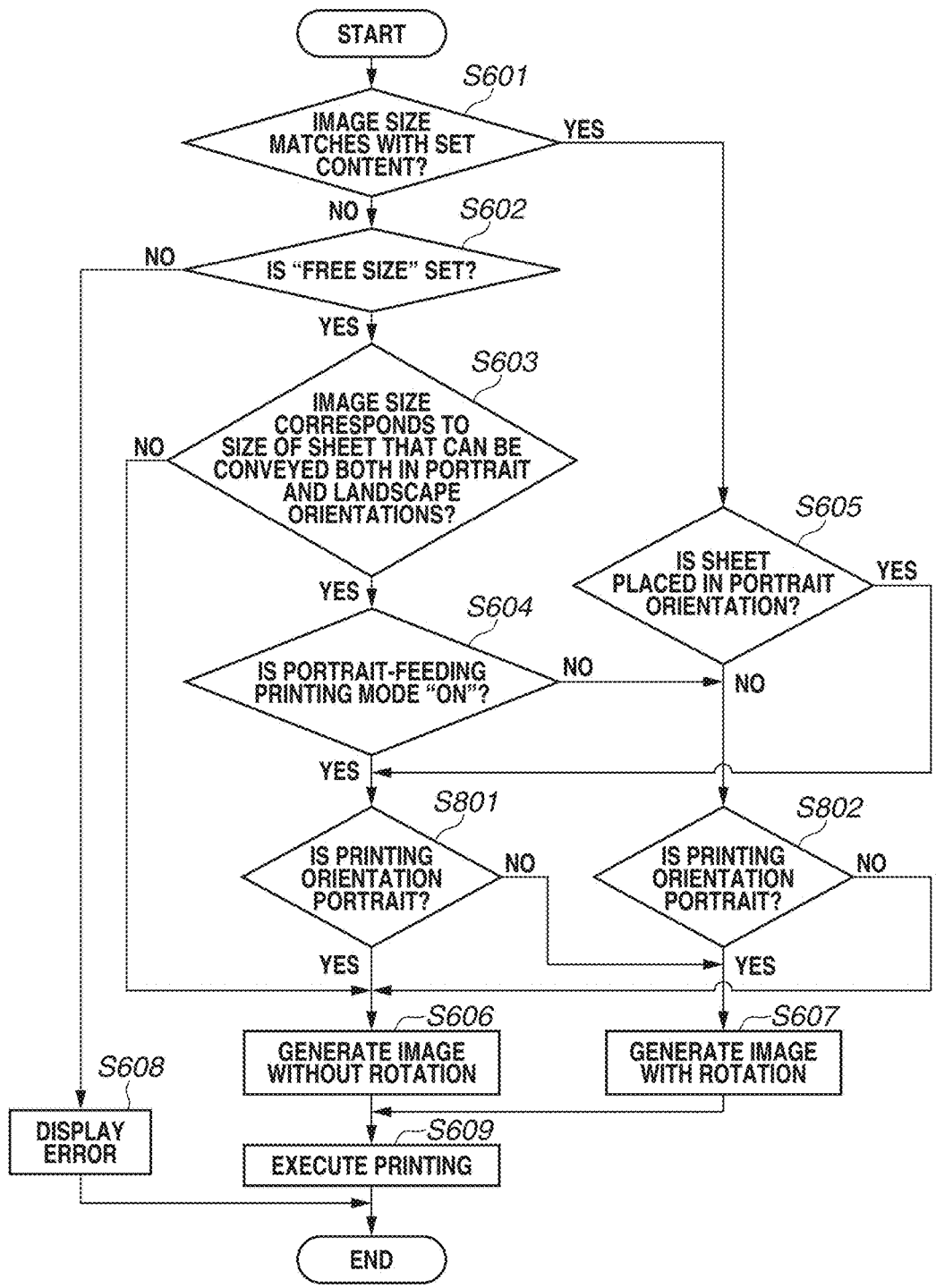

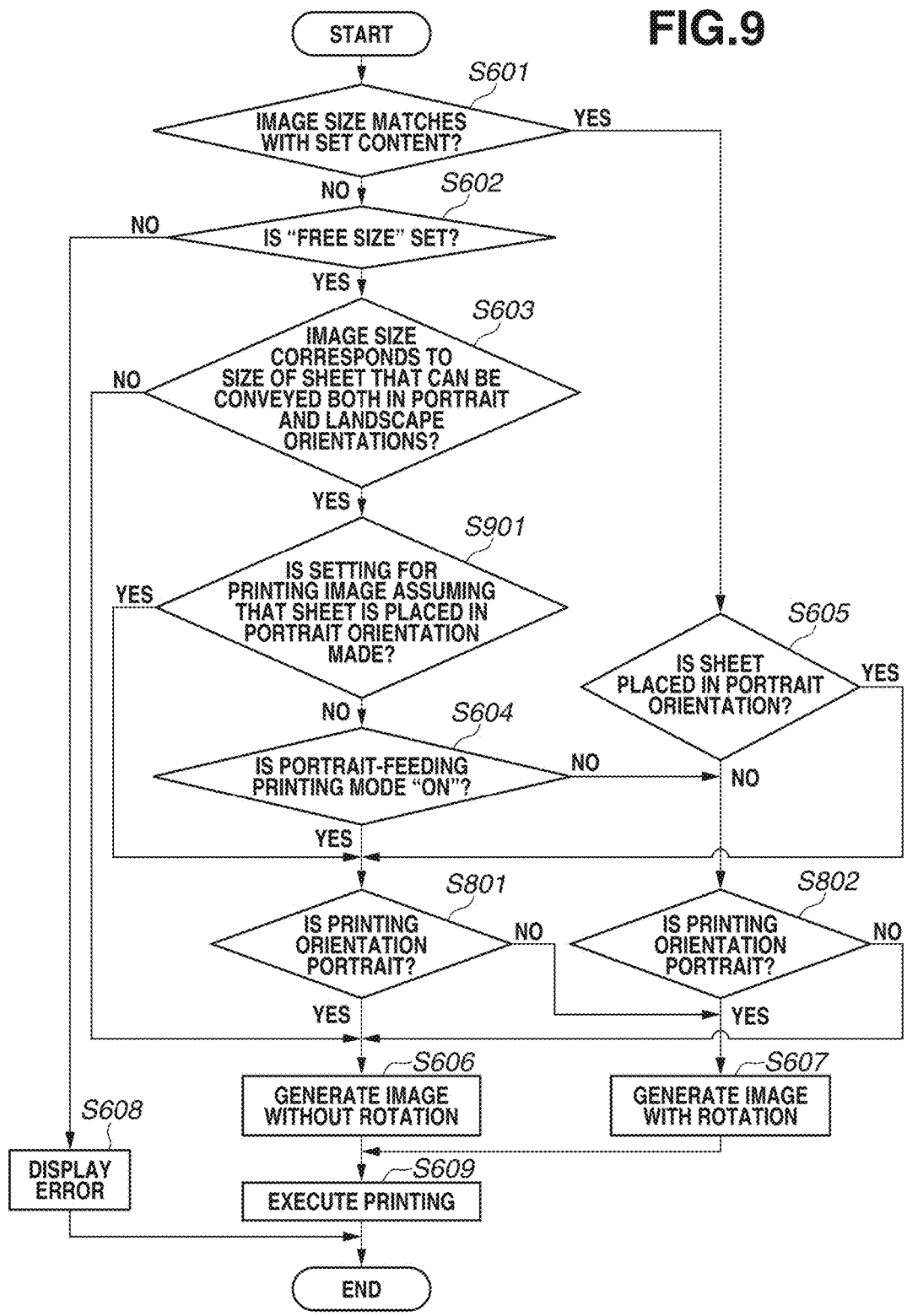

PRINTING APPARATUS, CONTROL METHOD FOR PRINTING APPARATUS, AND STORAGE MEDIUM

BACKGROUND OF THE INVENTION

Field of the Invention

The present invention relates to a printing apparatus capable of printing an image on a sheet conveyed from a sheet stacking unit.

Description of the Related Art

It has been previously known that, in printing apparatuses with sheet stacking units, images are printed on sheets conveyed from the sheet stacking units. Sheets of a plurality of sizes (e.g., A5 size and B5 size) can be stacked in the sheet stacking units. Further, some printing apparatuses can convey a sheet with the short side thereof as the leading edge (i.e., in a portrait orientation), and can convey a sheet with the long side thereof as the leading edge (i.e., in a landscape orientation).

A user who places a sheet in a sheet stacking unit needs to set a size such as A5 and B5 that corresponds to the sheet stacking unit. Further, the user also needs to set whether the sheet is placed so that the sheet is conveyed with the short side thereof as the leading edge, or the sheet is placed so that the sheet is conveyed with the long side thereof as the leading edge.

Based on information of settings thus made by the user, and information of settings made with respect to a printing target image (which sheet size and which orientation are to be adopted for printing), whether to execute printing or not execute printing but display an error message is determined. This can prevent occurrence of such a printing error that an image is printed on an incorrectly placed sheet (a sheet unsuitable for the size or orientation of a printing target image).

Further, Japanese Patent Application Laid-Open No. 2014-146057 discusses a technique of setting a size of a sheet as "FREE SIZE". For a user who uses sheets while frequently switches sheets of different sizes, it is annoying to set a size and an orientation of a sheet each time the user places a sheet. As a solution to this issue, it is known to provide an option of "FREE SIZE". When "FREE SIZE" is set by the user, printing is executed regardless of information of settings made with respect to a printing target image (which sheet size and which orientation are to be adopted for printing).

It is also known to perform printing after a printing target image is rotated. Japanese Patent Application Laid-Open No. 07-108718 discusses a technique whereby, when a width of an image to be printed on a sheet conveyed with the short side thereof as the leading edge is longer than a length of the short side, a loss in an image is prevented by performing printing after rotating the image by 90 degrees.

Usually, in a case where a printing target image is printed without being rotated, the image is printed in such a manner that the leading-edge side of a sheet in a sheet conveyance direction corresponds to the top of the image. If the image is desired to be printed in a portrait orientation (an orientation in which the short side of the sheet corresponds to the top of the image) as illustrated in FIG. 4A of the subject application, the sheet needs to be conveyed with the short side thereof as the leading edge.

However, when a sheet is conveyed with the short side thereof as the leading edge, the length of the sheet in the conveyance direction is longer as compared with a case where the sheet is conveyed with the long side thereof as the leading edge. Thus, time required for printing one sheet is long and printing efficiency is low.

In this regard, there is a printing apparatus configured to perform printing after rotating a printing target image by 90 degrees, on the premise that that a sheet is conveyed with the long side thereof as the leading edge when "FREE SIZE" is set as a size of the sheet. In this case, the sheet is conveyed as illustrated in FIG. 4B of the subject application. Thus, the length of the sheet in the conveyance direction is short, which can reduce the time required for printing one sheet.

Meanwhile, rotating an image by 90 degrees may cause a printing error. In the above-described printing apparatus, the user who sets "FREE SIZE" needs to place a sheet in an orientation so that the sheet is conveyed with the long side thereof as the leading edge. However, a user unfamiliar with this operation may place a sheet in an orientation with which the sheet is conveyed with the short side thereof as the leading edge, even though the user sets "FREE SIZE". In this case, a resultant print may have a partially lost image, as illustrated in FIG. 4C of the subject application.

Cases where such an issue tends to occur will be described in more detail, using specific examples. A first example is a case where a sheet of a small size such as A5 can be conveyed with either of the long side thereof and the short side thereof as the leading edge, whereas a sheet of a large size such as B5 can be conveyed only with the short side thereof as the leading edge. This is a case where a printable width in a main-scanning direction in a printing apparatus is longer than the length of the long side of an A5 sheet and the length of the short side of a B5 sheet, and shorter than the length of the long side of a B5 sheet.

In this case, the sheet of B5 size can be conveyed only in an orientation in which the short side thereof is the leading edge. Accordingly, even if "FREE SIZE" is set, an image is printed in such a manner that the leading-edge side of the sheet in the conveyance direction corresponds to the top of the image, on the premise that a sheet is conveyed in an orientation in which the short side thereof is the leading edge when a printing target image is of B5 size. Thus, when the printing target image is of B5 size, a sheet needs to be placed in the portrait orientation, even if "FREE SIZE" is set. For this reason, when a user who is used to placing a sheet of B5 size in the portrait orientation places a sheet, the user may likewise place a sheet of A5 size in the portrait orientation, which results in a resultant print having a partially lost image.

A second example is a case where two printing apparatuses, i.e., a printing apparatus that can convey a sheet of a small size such as A5 with either of the long side thereof and the short side thereof as the leading edge, and a printing apparatus that can convey a sheet of a small size such as A5 only with the short side thereof as the leading edge, are used together. As for the latter printing apparatus, a printable width in a main-scanning direction in the printing apparatus is longer than the length of the short side of an A5 sheet and shorter than the length of the long side of an A5 sheet.

In this case, in the latter printing apparatus, in the first place, the sheet of A5 size can be conveyed only with the short side thereof as the leading edge. Thus, even if "FREE SIZE" is set, a sheet needs to be placed in the portrait orientation. A user who usually uses this printing apparatus may place a sheet of A5 size in the portrait orientation when the user uses the former printing apparatus.

SUMMARY OF THE INVENTION

The present invention is directed to a printing apparatus, a control method for a printing apparatus, and a storage medium, that are capable of preventing an occurrence of a printing error in a case where printing starts in a state in which an orientation of a sheet stacked in a sheet stacking unit is not specified.

According to an aspect of the present invention, a printing apparatus includes a printing unit configured to print an image on a sheet conveyed from a sheet stacking unit, a storage unit for storing information indicating an orientation of the sheet stacked in the sheet stacking unit, a determination unit configured to determine whether to print the image in a first orientation corresponding to a case where the sheet is conveyed with a short side thereof as a leading edge from the sheet stacking unit, or to print the image in a second orientation corresponding to a case where the sheet is conveyed with a long side thereof as the leading edge from the sheet stacking unit, and a storing unit configured to store a setting value based on an operation of a user, wherein, in a case where the information indicating the orientation of the sheet stacked in the sheet stacking unit is not stored in the storage unit, the determination unit determines whether to print the image in the first orientation or to print the image in the second orientation, according to the setting value stored in the storing unit.

Further features of the present invention will become apparent from the following description of exemplary embodiments with reference to the attached drawings.

BRIEF DESCRIPTION OF THE DRAWINGS

FIG. 3 is a diagram illustrating an example of a screen displayed at a display unit of a printing apparatus according to an exemplary embodiment.

FIG. 6 is a flowchart illustrating an operation of a printing apparatus according to an exemplary embodiment.

FIG. 8 is a flowchart illustrating an operation of a printing apparatus according to an exemplary embodiment.

FIG. 9 is a flowchart illustrating an operation of a printing apparatus according to an exemplary embodiment.

DESCRIPTION OF THE EMBODIMENTS

Exemplary embodiments of the present invention will be described in detail below with reference to the attached drawings. The exemplary embodiments described below are not intended to limit the invention according to the scope of claims, and not all combinations of features described in the exemplary embodiments are necessary for a solution of the invention.

Figure 1:
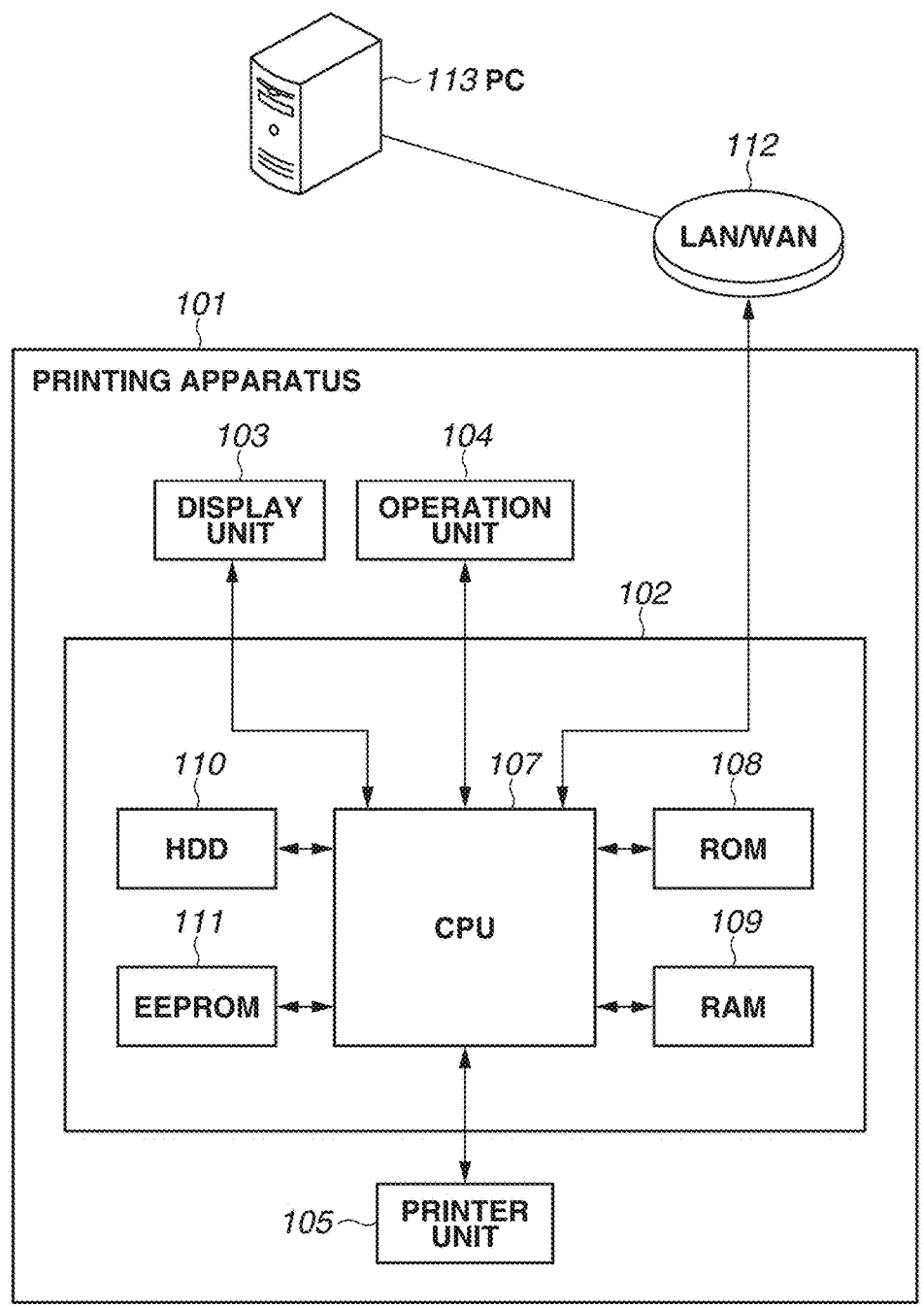
FIG. 1 is a block diagram illustrating an overall configuration of a system including a printing apparatus according to an exemplary embodiment.

FIG. 1 is a block diagram illustrating an overall configuration of a system including a printing apparatus 101 that is an example of a printing apparatus according to a first exemplary embodiment. The printing apparatus 101 includes a controller unit 102, a display unit 103, an operation unit 104, and a printer unit 105. The display unit 103 includes components such as a light emitting diode (LED) and a liquid crystal display, and displays content of operation of a user and an internal state of the printing apparatus 101. The operation unit 104 receives operation of the user via a hard key group or a touch panel function of the display unit 103.

The printer unit 105 receives a printing instruction from the controller unit 102, and prints an image on a sheet based on image data transmitted from the controller unit 102. Examples of the sheet include plain paper, a cardboard, and a transparent film. The controller unit 102 includes a central processing unit (CPU) 107, a read only memory (ROM) 108, a random access memory (RAM) 109, a hard disk drive (HDD) 110, and an electrically erasable programmable ROM (EEPROM) 111. The CPU 107 executes a control program stored inside the printing apparatus 101, thereby controlling an operation of a device connected to the controller unit 102, via, for example, each interface (I/F) and memory of a storage medium. The ROM 108 stores a boot program necessary for system startup. The RAM 109 is a volatile memory, and used as a work memory in execution of a control program.

The HDD 110 is a storage medium such as a magnetic disk, and stores, for example, a control program and image data. The EEPROM 111 is a nonvolatile memory, and stores, for example, setting values necessary in execution of a control program. In the printing apparatus 101, the CPU 107, which is a single CPU, is assumed to execute each process illustrated in a flowchart to be described below by using one memory (the RAM 109), but other mode may be adopted. For example, each process can also be executed by causing a plurality of CPUs and a plurality of RAMs, HDDs, or solid-state drives (SSDs) to operate together. In addition, some of processes to be described below may be executed using a hardware circuit such as an application specific integrated circuit (ASIC).

The CPU 107 can receive page description language (PDL) data from a personal computer (PC) 113, which is an external apparatus, via a local area network/wide area network (LAN/WAN) 112. The CPU 107 can then cause the printer unit 105 to execute printing based on the received PDL data (a PDL job). The PDL data is generated by a printer driver installed on the PC 113 serving as a host computer. Setting by the PC 113 described below is assumed to be setting performed via a screen displayed by the printer driver.

Figure 2A:
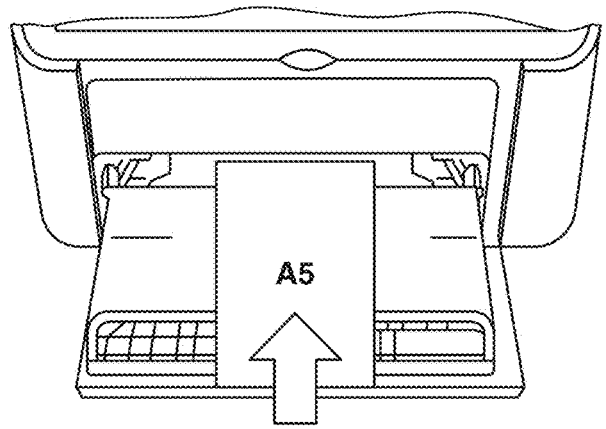
FIGS. 2A, 2B, and 2C are diagrams each illustrating an external view of a printing apparatus according to an exemplary embodiment.
Figure 2B:
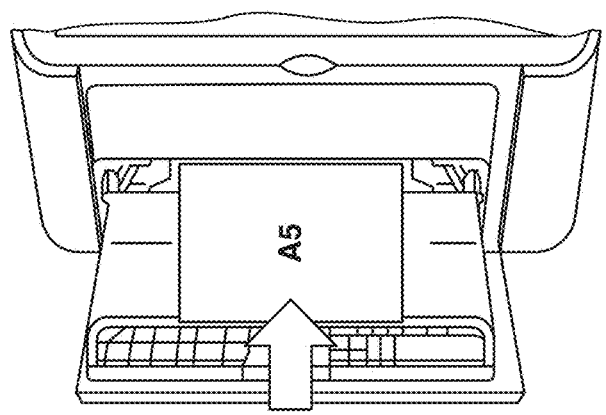
Figure 2C:
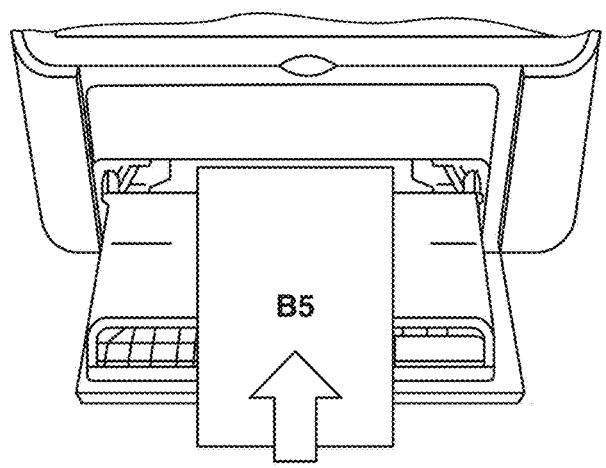

FIGS. 2A, 2B, and 2C are diagrams each illustrating an external view of the printing apparatus 101 in a case where a manual feeding tray included in the printing apparatus 101 is used as a feeder of a sheet. The printing apparatus 101 includes the manual feeding tray and a cassette (not illustrated), each as a sheet stacking unit that can be used as a feeder of a sheet. More sheets can be stacked in the cassette than in the manual feeding tray, but it takes effort to change the sheets in the cassette. On the other hand, the amount of sheets that can be stacked in the manual feeding tray is less than in the cassette, but it is easy to change the sheets in the manual feeding tray. Thus, it can be said that the manual feeding tray is suitable for a case where a user uses sheets while frequently switching sheets of different sizes.

FIG. 2A illustrates a case where a sheet of A5 size is placed in a portrait orientation to be conveyed with the short side as the leading edge. FIG. 2B illustrates a case a sheet of A5 size in a landscape orientation to be conveyed with the long side as the leading edge. In this way, in the manual feeding tray of the printing apparatus 101, the sheet of A5 size can be placed in either of the portrait orientation and the landscape orientation.

In contrast, FIG. 2C illustrates a case where a sheet of B5 size is placed in the portrait orientation to be conveyed with the short side as the leading edge. In the manual feeding tray of the printing apparatus 101, the sheet of B5 size can be placed in the portrait orientation, but cannot be placed in the landscape orientation. To perform printing on the sheet of B5 size conveyed with the long side as the leading edge, a printable width in a main-scanning direction needs to be longer than the length of the long side of B5. However, the printing apparatus 101 is a relatively small printing apparatus, and thus the printable width in the main-scanning direction is shorter than the length of the long side of B5. Therefore, in the printing apparatus 101, the sheet of B5 size can be conveyed only with the short side as the leading edge.

FIG. 3 is a diagram illustrating an operation screen displayed at the display unit 103 when a user sets a size and an orientation of a sheet stacked in the manual feeding tray. In the illustrated screen, "B5", "A5 PORTRAIT", "A5 LANDSCAPE", and "FREE SIZE" are displayed as options, and a state where "A5 PORTRAIT" is selected is illustrated. As described above, in the printing apparatus 101, the sheet of A5 size can be placed in either of the portrait orientation and the landscape orientation, and therefore, "A5 PORTRAIT" and "A5 LANDSCAPE" are available as options. On the other hand, the sheet of B5 size can be placed only in the portrait orientation, and therefore only one option of "B5" is available. When "B5" is selected, an image is printed in an orientation corresponding to a case where the sheet of B5 size is conveyed with the short side as the leading edge.

The option indicated as "FREE SIZE" is available for, for example, a case where a user uses sheets while frequently switching sheets of different sizes. For the user, it is annoying to set a size and an orientation of a sheet each time the user places a sheet. When "FREE SIZE" is set, printing is executed regardless of information (which sheet size and which orientation are to be adopted for printing) set for a printing target image. The printing orientation of an image in a case where "FREE SIZE" is selected will be described below. The setting made in the screen illustrated in FIG. 3 is assumed to be stored in the EEPROM 111, but may be stored in the RAM 109 or the HDD 110.

Figure 4A:
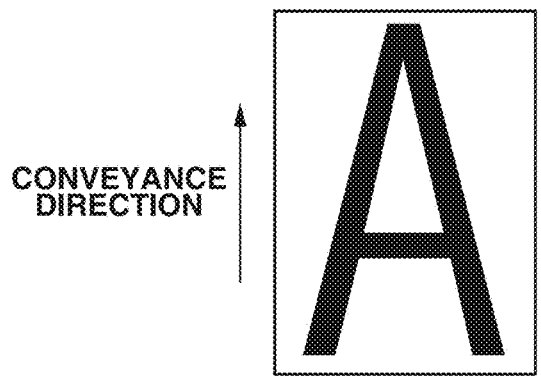
FIGS. 4A, 4B, and 4C are diagrams each illustrating an example of a print printed by a printing apparatus according to an exemplary embodiment.
Figure 4B:
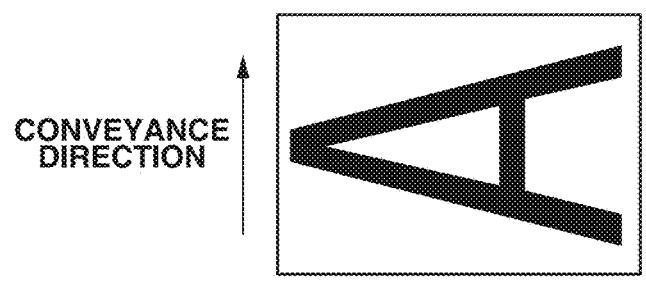
Figure 4C:
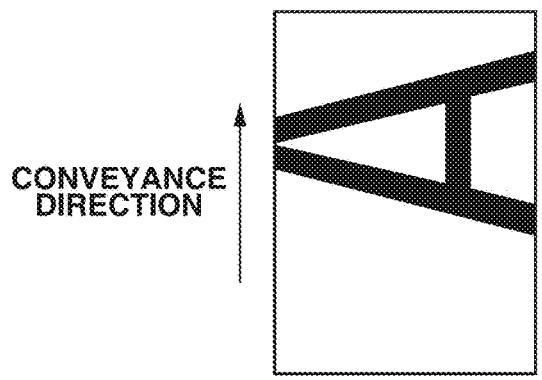

FIGS. 4A, 4B, and 4C are diagrams each illustrating an example of a print of an image printed on a sheet of A5 size. FIG. 4A illustrates a case where an image is printed in a portrait orientation (an orientation in which the short side of a sheet corresponds to the top of an image), and a sheet is conveyed with the short side thereof as the leading edge. In this case, as illustrated in FIG. 4A, the image is printed in the orientation in which the short side on the leading-edge side in the conveyance direction corresponds to the top of the image. FIG. 4B illustrates a case where the image is printed in the portrait orientation, and a sheet is conveyed with the long side thereof as the leading edge. In this case, as illustrated in FIG. 4B, the image is printed in the orientation in which the short side at a flank in the conveyance direction corresponds to the top of the image. For performing the printing as illustrated in FIG. 4B, image processing for rotating the image transmitted from the PC 113 by 90 degrees is executed before the printing.

In a case where a printing target image is of A5 size, printing the image in the portrait orientation is specified, and "A5 PORTRAIT" is set in the screen illustrated in FIG. 3, the printing is performed as illustrated in FIG. 4A. On the other hand, in a case where a printing target image is of A5 size, printing the image in the portrait orientation is specified, and "A5 LANDSCAPE" is set in the screen illustrated in FIG. 3, the printing is performed as illustrated in FIG. 4B.

In a case where a printing target image is of A5 size, printing the image in the portrait orientation is specified, and "FREE SIZE" is set in the screen illustrated in FIG. 3, the printing is performed as illustrated in FIG. 4B, in the printing apparatus 101 at the time of factory shipment. This is because the printing apparatus 101 is premised on conveyance of a sheet with the long side thereof as the leading edge. One reason for this is that, if the sheet is conveyed with the long side as the leading edge, the length of the sheet in the conveyance direction is reduced and printing efficiency is improved, as compared with a case where the sheet is conveyed with the short side as the leading edge.

However, in the case where the printing target image is of A5 size, printing the image in the portrait orientation is specified, and "FREE SIZE" is set in the screen illustrated in FIG. 3, the user may be unaware that the image is to be printed in a state of being rotated by 90 degrees. In such a situation, the user may incorrectly place a sheet in the portrait orientation. If the sheet is placed in the portrait orientation, even though the printing target image is of A5 size, printing the image in the portrait orientation is specified, and "FREE SIZE" is set in the screen illustrated in FIG. 3, the printing is performed as illustrated in FIG. 4C. In other words, the orientation of the image and the orientation of the sheet do not match with each other, which results in a print in which the image is partially lost.

Therefore, in the printing apparatus 101, it is possible to set whether to perform printing as illustrated in FIG. 4A or to perform printing as illustrated in FIG. 4B, in the case where the printing target image is of A5 size, printing the image in the portrait orientation is specified, and "FREE SIZE" is set. In other words, in an environment where a user is used to placing a sheet in the portrait orientation, printing to be performed as illustrated in FIG. 4A can be set, which can prevent occurrence of a printing error.

Figure 5:
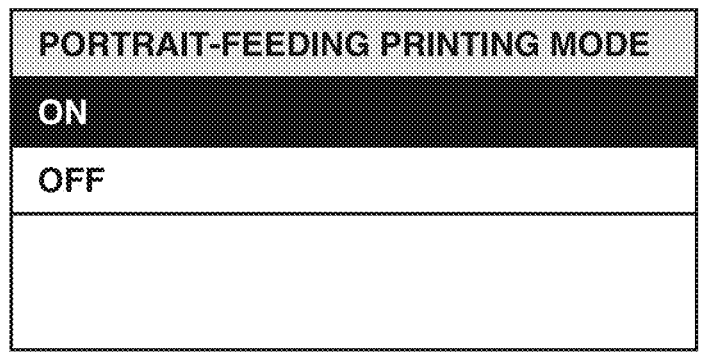
FIG. 5 is a diagram illustrating an example of a screen displayed at the display unit of a printing apparatus according to an exemplary embodiment.

FIG. 5 is a diagram illustrating an operation screen displayed at the display unit 103 when a user sets whether to print an image assuming that a sheet is placed in the portrait orientation (portrait-feeding printing mode) or to print an image assuming that a sheet is placed in the landscape orientation, in a case where "FREE SIZE" is set. When the portrait-feeding printing mode is set to "ON" in the screen illustrated in FIG. 5, the printing is performed as illustrated in FIG. 4A, in the case where the printing target image is of A5 size, printing the image in the portrait orientation is specified, and "FREE SIZE" is set in the screen illustrated in FIG. 3. On the other hand, when the portrait-feeding printing mode is set to "OFF" in the screen illustrated in FIG. 5, the printing is performed as illustrated in FIG. 4B, in the case where the printing target image is of A5 size, printing the image in the portrait orientation is specified, and "FREE SIZE" is set in the screen illustrated in FIG. 3. An initial value of this setting value is "OFF". The setting made in the screen illustrated in FIG. 5 is assumed to be stored in the EEPROM 111, but may be stored in the RAM 109 or the HDD 110.

FIG. 6 is a flowchart illustrating a print operation in a case where the manual feeding tray is used as a feeder of a sheet. Each operation (step) illustrated in the flowchart of FIG. 6 is implemented by the CPU 107 of the printing apparatus 101 executing a control program stored in the ROM 108.

In step S601, the CPU 107 judges whether the size of a printing target image specified by the PC 113 matches with the content set in the screen illustrated in FIG. 3. Herein, in a case where the size of the printing target image is A5, the CPU 107 judges that the size of the printing target image matches with the set content if "A5 PORTRAIT" or "A5 LANDSCAPE" is set in the screen illustrated in FIG. 3. Further, if "FREE SIZE" is set in the screen illustrated in FIG. 3, the CPU 107 judges that the size of the printing target image does not match with the set content, regardless of the size of the printing target image specified by the PC 113. If the size of the printing target image specified by the PC 113 matches with the content set in the screen illustrated in FIG. 3 (YES in step S601), the processing proceeds to step S605. On the other hand, if the size of the printing target image specified by the PC 113 does not match with the content set in the screen illustrated in FIG. 3 (NO in step S601), the processing proceeds to step S602.

In step S605, the CPU 107 judges whether the content set in the screen illustrated in FIG. 3 indicates that the sheet is placed in the portrait orientation or the sheet is placed in the landscape orientation. As a result of the judgment, the content indicates that the sheet is placed in the portrait orientation (YES in step S605), the processing proceeds to step S606. On the other hand, if the content indicates that the sheet is placed in the landscape orientation (NO in step S605), the processing proceeds to step S607. In a case where "B5" is set in the screen illustrated in FIG. 3, since the sheet can be placed only in the portrait orientation, the judgment in step S605 may be skipped and the processing may proceed to step S606.

In step S602, the CPU 107 judges whether "FREE SIZE" is set in the screen illustrated in FIG. 3. If "FREE SIZE" is set (YES in step S602), the processing proceeds to step S603. On the other hand, if "FREE SIZE" is not set (NO in step S602), the processing proceeds to step S608. In step S608, since a sheet suitable for the printing target image is not stacked in the manual feeding tray, the CPU 107 displays an occurrence of an error at the display unit 103 and ends the processing.

In step S603, the CPU 107 judges whether the size of the printing target image corresponds to a size of a sheet that can be placed and conveyed in both of the portrait and landscape orientations or to a size of a sheet that can be placed and conveyed only in the portrait orientation. Herein, if the size of the printing target image is A5 (YES in step S603), the processing proceeds to step S604. On the other hand, if the size of the printing target image is B5 (NO in step S603), the processing proceeds to step S606.

In step S604, the CPU 107 judges whether the setting (portrait-feeding printing mode) in the screen illustrated in FIG. 5 is "ON" or "OFF". If the setting is "ON" (YES in step S604), the processing proceeds to step S606. On the other hand, if the setting is "OFF" (NO in step S604), the processing proceeds to step S607. In the printing apparatus 101, the setting illustrated in FIG. 5 and the branch in step S604 are provided. Thus, it is possible to prevent an occurrence of a printing error in a case where printing starts in a state in which the orientation of a sheet stacked in the sheet stacking unit (the manual feeding tray) is not specified (FREE SIZE).

In step S606, the CPU 107 generates an image by performing conversion of the printing target image without the processing for image rotation. On the other hand, in step S607, the CPU 107 generates an image by performing conversion of the printing target image with the processing for image rotation. In step S609, the CPU 107 executes the printing.

Next, a second exemplary embodiment will be described. The first exemplary embodiment is described on the premise that an image is printed in the portrait orientation (the orientation in which the short side of a sheet corresponds to the top of an image). In the second exemplary embodiment, a case in which whether an image is to be printed in the portrait orientation or in the landscape orientation (the orientation in which the long side of a sheet corresponds to the top of an image) can be specified by the PC 113 will be described.

Figure 7A:
FIGS. 7A, 7B, and 7C are diagrams each illustrating an example of a print printed by a printing apparatus according to an exemplary embodiment.
Figure 7B:
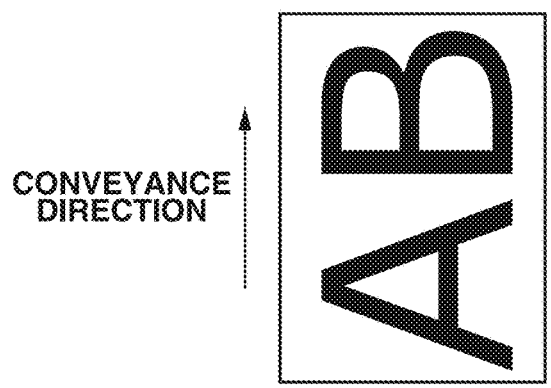
Figure 7C:
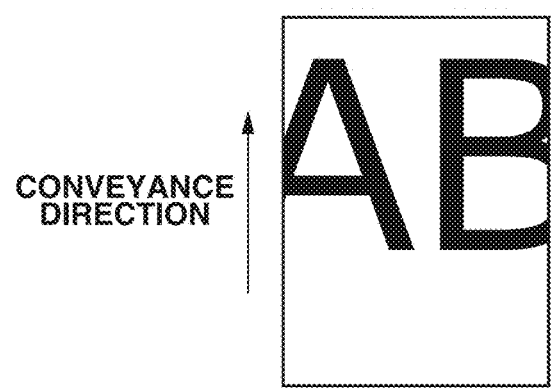

FIGS. 7A, 7B, and 7C are diagrams each illustrating an example of a print of an image printed on a sheet of A5 size. FIG. 7A illustrates a case where an image is printed in the landscape orientation (the orientation in which the long side of a sheet corresponds to the top of an image), and the sheet is conveyed with the long side as the leading edge. In this case, the image is printed in the orientation in which the long side on the leading-edge side in the conveyance direction corresponds to the top of the image, as illustrated in FIG. 7A. FIG. 7B illustrates a case where an image is printed in the landscape orientation and the sheet is conveyed with the short side as the leading edge. In this case, the image is printed in the orientation in which the long side at a flank in the conveyance direction corresponds to the top of the image, as illustrated in FIG. 7B. For performing the printing as illustrated in FIG. 7B, image processing for rotating the image transmitted from the PC 113 by 90 degrees is executed before the printing.

In a case where a printing target image is of A5 size, printing the image in the landscape orientation is specified, and "A5 LANDSCAPE" is set in the screen illustrated in FIG. 3, the printing is performed as illustrated in FIG. 7A. On the other hand, in a case where a printing target image is of A5 size, printing the image in the landscape orientation is specified, and "A5 PORTRAIT" is set in the screen illustrated in FIG. 3, the printing is performed as illustrated in FIG. 7B.

In a case where a printing target image is of A5 size, printing the image in the landscape orientation is specified, and "FREE SIZE" is set in the screen illustrated in FIG. 3, the printing is performed as illustrated in FIG. 7A, in the printing apparatus 101 at the time of factory shipment. This is because the printing apparatus 101 is premised on conveyance of a sheet with the long side thereof as the leading edge. One reason for this is that, if the sheet is conveyed with the long side as the leading edge, the length of the sheet in the conveyance direction is reduced and printing efficiency is improved, as compared with a case where the sheet is conveyed with the short side as the leading edge.

However, in the case where the printing target image is of A5 size, printing the image in the landscape orientation is specified, and "FREE SIZE" is set in the screen illustrated in FIG. 3, the user may be unaware that the image is to be printed without being rotated by 90 degrees. In such a situation, the user may incorrectly place a sheet in the portrait orientation. If the sheet is placed in the portrait orientation, even though the printing target image is of A5 size, printing the image in the landscape orientation is specified, and "FREE SIZE" is set in the screen illustrated in FIG. 3, the printing is performed as illustrated in FIG. 7C. In other words, the orientation of the image and the orientation of the sheet do not match with each other, which results in a print in which the image is partially lost.

Thus, in the printing apparatus 101, in the case where the printing target image is of A5 size, printing the image in the landscape orientation is specified, and "FREE SIZE" is set, it is possible to set whether to perform printing as illustrated in FIG. 7A or to perform printing as illustrated in FIG. 7B. In other words, in an environment where a user is used to placing a sheet in the portrait orientation, printing to be performed as illustrated in FIG. 7B can be set, which can prevent occurrence of a printing error.

FIG. 8 is a flowchart illustrating a print operation in a case where the manual feeding tray is used as a feeder of a sheet. In the second exemplary embodiment, the operation illustrated in the flowchart of FIG. 8 is executed in place of the operation illustrated in the flowchart of FIG. 6 described in the first exemplary embodiment. Each operation (step) illustrated in the flowchart of FIG. 8 is implemented by the CPU 107 of the printing apparatus 101 executing a control program stored in the ROM 108. In the flowchart of FIG. 8, steps for performing processes similar to the processes in the flowchart of FIG. 6 are provided with reference numerals common to FIG. 6.

When compared with the flowchart of FIG. 6, step S801 and step S802 are added in the flowchart of FIG. 8. In step S801, the CPU 107 judges a printing orientation set by the PC 113. If the printing orientation is the portrait orientation (the orientation in which the short side of a sheet corresponds to the top of an image) (YES in step S801), the processing proceeds to step S606. If the printing orientation is the landscape orientation (the orientation in which the long side of a sheet corresponds to the top of an image) (NO in step S801), the processing proceeds to step S607.

In step S802, similarly, the CPU 107 judges a printing orientation set by the PC 113. If the printing orientation is the portrait orientation (the orientation in which the short side of a sheet corresponds to the top of an image) (YES in step S802), the processing proceeds to step S607. If the printing orientation is the landscape orientation (the orientation in which the long side of a sheet corresponds to the top of an image) (NO in step S802), the processing proceeds to step S606.

Here, when FIGS. 7A and 7B are compared with FIGS. 4A and 4B, the image is rotated if the sheet is conveyed with the short side as the leading edge in FIGS. 7A and 7B, whereas the image is rotated if the sheet is conveyed with the long side as the leading edge in FIGS. 4A and 4B. On the contrary, the image is not rotated if the sheet is conveyed with the long side as the leading edge in FIGS. 7A and 7B, whereas the image is not rotated if the sheet is conveyed with the short side as the leading edge in FIGS. 4A and 4B. In other words, in the case where the printing orientation is the landscape orientation as illustrated in FIGS. 7A and 7B, determination as to whether it is necessity to perform the rotation is opposite to the determination in the case where the printing orientation is the portrait orientation. In FIG. 8, processing considering this point can be performed by providing the branch in each of step S801 and step S802.

Next, a third exemplary embodiment will be described. In the example described in the first and second exemplary embodiments, whether to print an image assuming that a sheet is placed in the portrait orientation, or to print an image assuming that a sheet is placed in the landscape orientation, in the case where "FREE SIZE" is set, is set only by the printing apparatus 101. In contrast, there will be described a case where whether to print an image assuming that a sheet is placed in the portrait orientation, or to print an image assuming that a sheet is placed in the landscape orientation, in the case where "FREE SIZE" is set, can also be set by the PC 113.

FIG. 9 is a flowchart illustrating a print operation in a case where the manual feeding tray is used as a feeder of a sheet. In the third exemplary embodiment, the operation illustrated in the flowchart of FIG. 9 is executed in place of the operation illustrated in the flowchart of FIG. 8 described in the second exemplary embodiment. Each operation (step) illustrated in the flowchart of FIG. 9 is implemented by the CPU 107 of the printing apparatus 101 executing a control program stored in the ROM 108. In the flowchart of FIG. 9, steps for performing processes similar to the processes in the flowchart of FIG. 8 are provided with reference numerals common to FIG. 8.

When compared with the flowchart of FIG. 8, step S901 is added in the flowchart of FIG. 9. In step S901, the CPU 107 judges whether a setting for printing an image assuming that a sheet is placed in the portrait orientation in a case where "FREE SIZE" is set is made by the PC 113. If the setting for printing an image assuming that a sheet is placed in the portrait orientation in a case where "FREE SIZE" is set is made by the PC 113 (YES in step S901), step S604 is skipped and the processing proceeds to step S801. This processing enables the user to set such printing, i.e., printing an image assuming that a sheet is placed in the portrait orientation in a case where "FREE SIZE" is set, by operating the screen of the printer driver, without operating the printing apparatus 101.

On the other hand, if the setting for printing an image assuming that a sheet is placed in the portrait orientation in a case where "FREE SIZE" is set is not made by the PC 113 (NO in step S901), the processing proceeds to step S604.

As described above, the printing apparatus 101 includes the printer unit 105 capable of printing an image on a sheet conveyed from the manual feeding tray, and stores information indicating an orientation of a sheet stacked in the manual feeding tray. Further, the CPU 107 determines whether to print an image in a first orientation corresponding to a case where a sheet is conveyed with the short side as the leading edge from the manual feeding tray, or to print an image in a second orientation corresponding to a case where a sheet is conveyed with the long side as the leading edge from the manual feeding tray. Furthermore, the CPU 107 determines, in a case where information indicating an orientation of a sheet stacked in the manual feeding tray is not stored (when "FREE SIZE" is set), whether to print an image in the first orientation or to print an image in the second orientation, according to a setting value based on the operation of the user.

These configurations can prevent occurrence of a printing error in a case where printing starts in a state in which an orientation of a sheet stacked in the sheet stacking unit is not specified.

In the example described above, the printing apparatus 101 can perform the printing only for the sheets of A5 size and B5 size, but may be capable of performing printing for sheets of other sizes. In addition, B5 is taken as an example of the size of the sheet that cannot be conveyed with the long side thereof as the leading edge, but the printable width in the main-scanning direction may be increased to enable conveyance of a sheet of B5 size with the long side as the leading edge. In this case, a sheet of a size (e.g., B4) larger than B5 can be conveyed with the short side as the leading edge, but cannot be conveyed with the long side as the leading edge.

As for the screen illustrated in FIG. 5, the setting via this screen is received before the printing. Further, for example, the screen illustrated in FIG. 5 may pop up, in a case where a printing target image is received from the PC 113, and the setting via the screen illustrated in FIG. 3 is "FREE SIZE".

Moreover, although the control related to the manual feeding tray has been described above as an example, the ideas of the above-described exemplary embodiments may be applied to a case where a component (e.g., the cassette) other than the manual feeding tray is used as a sheet feeder.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-192210, filed Sep. 29, 2015, which is hereby incorporated by reference herein in its entirety.

What is claimed is:

1. A printing apparatus comprising:
a printing unit which prints an image on a sheet conveyed from a sheet stacking unit;
an information storage unit which stores information indicating an orientation of the sheet stacked in the sheet stacking unit;
a determination unit which determines whether to print the image in a first orientation corresponding to a case where the sheet is conveyed with a short side thereof as a leading edge from the sheet stacking unit, or to print the image in a second orientation corresponding to a case where the sheet is conveyed with a long side thereof as the leading edge from the sheet stacking unit; and
a setting storage unit which stores a setting value based on an operation of a user,
wherein, in a case where the information indicating the orientation of the sheet stacked in the sheet stacking unit is not stored in the information storage unit, the determination unit determines whether to print the image in the first orientation or to print the image in the second orientation, according to the setting value stored in the setting storage unit.

2. The printing apparatus according to claim 1, wherein, in a case where the information indicating the orientation of the sheet stacked in the sheet stacking unit is stored in the information storage unit, the determination unit determines whether to print the image in the first orientation or to print the image in the second orientation, according to the orientation indicated by the stored information.

3. The printing apparatus according to claim 1, wherein an initial value of the setting value stored by the setting storage unit is a value according to which the determination unit determines that the image is to be printed in the second orientation.

4. The printing apparatus according to claim 1, further comprising an image processing unit configured to rotate a printing target image, in a case where the determination unit determines that the image is to be printed in the second orientation.

5. The printing apparatus according to claim 1,
wherein the sheet stacking unit is capable of stacking a sheet of a first size, and a sheet of a second size having a long side that is longer than a long side of the sheet of the first size,
wherein the sheet of the first size can be conveyed both with a short side thereof as a leading edge and with the long side thereof as the leading edge, and
wherein the sheet of the second size can be conveyed with a short side thereof as a leading edge, while the sheet of the second size cannot be conveyed with the long side thereof as the leading edge.

6. The printing apparatus according to claim 5, wherein the first size is A5 size, and the second size is B5 size.

7. The printing apparatus according to claim 1, wherein the sheet stacking unit is a manual feeding tray.

8. A control method for a printing apparatus including a printing unit configured to print an image on a sheet conveyed from a sheet stacking unit, the control method comprising:
storing a setting value which is based on an operation of a user;
judging whether information indicating an orientation of the sheet stacked in the sheet stacking unit is stored; and
determining, in a case where the judging judges that the information indicating the orientation of the sheet stacked in the sheet stacking unit is not stored, whether to print the image in a first orientation or to print the image in a second orientation, according to the stored setting value,
wherein the first orientation corresponds to a case where the sheet is conveyed with a short side thereof as a leading edge from the sheet stacking unit, and the second orientation corresponds to a case where the sheet is conveyed with a long side thereof as the leading edge from the sheet stacking unit.

9. A non-transitory computer readable storage medium storing a program which causes a computer to execute a control method for a printing apparatus including a printing unit configured to print an image on a sheet conveyed from a sheet stacking unit, the control method comprising:
storing a setting value which is based on an operation of a user;
judging whether information indicating an orientation of the sheet stacked in the sheet stacking unit is stored; and determining, in a case where the judging judges that the information indicating the orientation of the sheet stacked in the sheet stacking unit is not stored, whether to print the image in a first orientation or to print the image in a second orientation, according to the stored setting value, wherein the first orientation corresponds to a case where the sheet is conveyed with a short side thereof as a leading edge from the sheet stacking unit, and the second orientation corresponds to a case where the sheet is conveyed with a long side thereof as the leading edge from the sheet stacking unit.

\* \* \* \* \*